H. LEMKE.
CONVERTIBLE WHEELBARROW AND TRUCK.
APPLICATION FILED APR. 5, 1917.
1,243,432.
Patented Oct. 16, 1917.
2 SHEETS—SHEET 1.
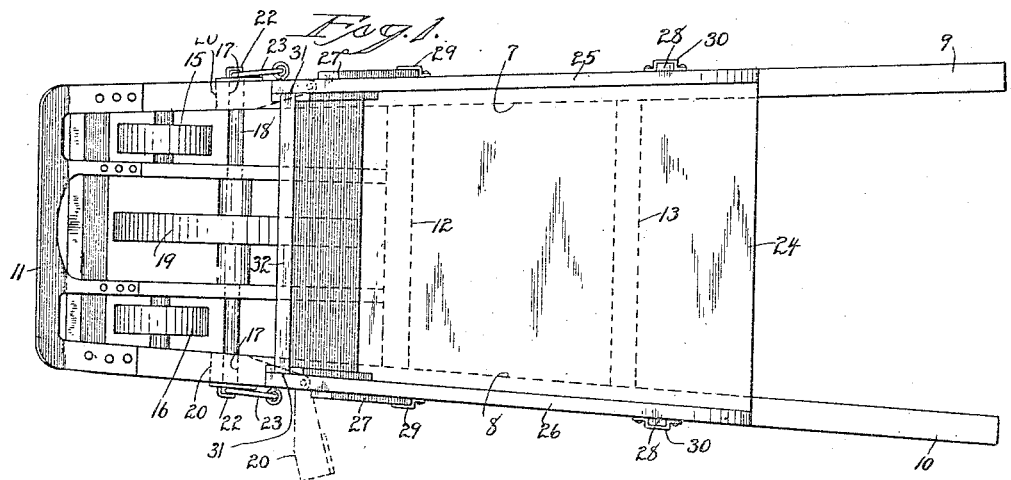
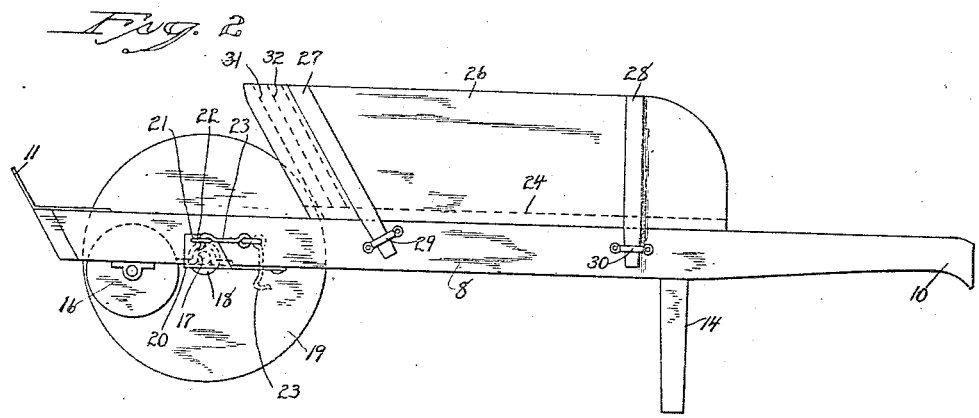
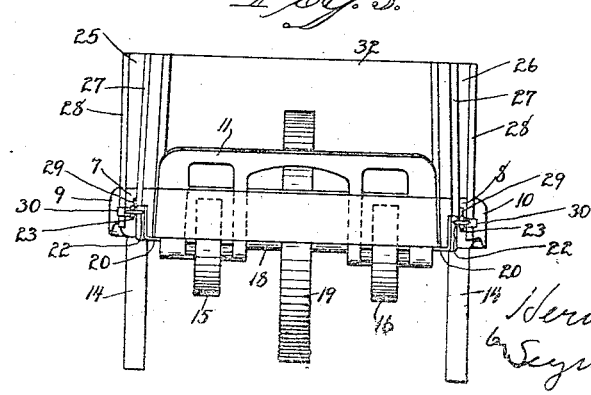

H. LEMKE.
CONVERTIBLE WHEELBARROW AND TRUCK.
APPLICATION FILED APR. 5, 1917.
1,243,432.
Patented Oct. 16, 1917.
2 SHEETS—SHEET 2.
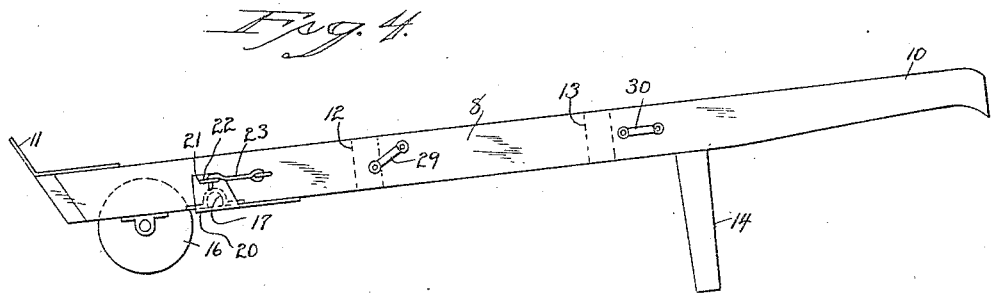
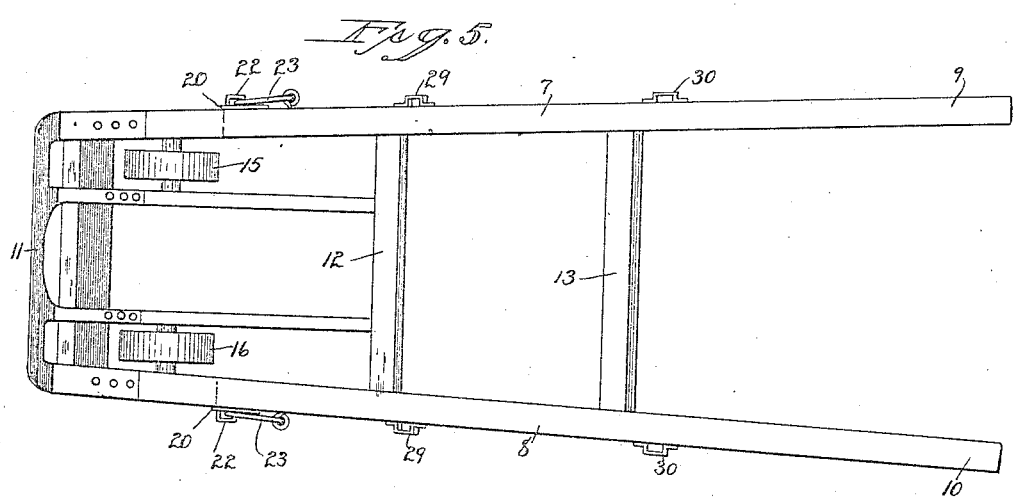
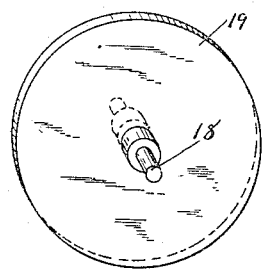

UNITED STATES PATENT OFFICE.

HERMAN LEMKE, OF CLINTON, CONNECTICUT.

CONVERTIBLE WHEELBARROW AND TRUCK.

1,243,432.

Specification of Letters Patent.

Patented Oct. 16, 1917.

Application filed April 5, 1917. Serial No. 159,873

*To all whom it may concern:*

Be it known that I, HERMAN LEMKE, a citizen of the United States, residing at Clinton, in the county of Middlesex and State of Connecticut, have invented a new and useful Improvement in Convertible Wheelbarrows and Trucks; and I do hereby declare the following, when taken in connection with the accompanying drawings and the characters of reference marked thereon, to be a full, clear, and exact description of the same, and which said drawings constitute part of this application and represent in—

Figure 1 a top or plan view of a combined wheelbarrow and truck constructed in accordance with my invention, shown in the form of a wheelbarrow.

Fig. 2 a side view of the same.

Fig. 3 a rear end view.

Fig. 4 a side view of the device converted for use as a truck.

Fig. 5 a top or plan view of the same.

Fig. 6 a perspective view of the wheel, detached.

This invention relates to an improvement in a convertible wheelbarrow and truck, the object being to provide a simple construction whereby a two-wheeled truck may be readily converted into a one wheeled barrow; and the invention consists in the construction hereinafter described and particularly recited in the claims.

In carrying out my invention, I employ a frame consisting of side pieces 7 and 8 provided at their rear ends with usual handles 9 and 10 and connected at their forward ends by the usual truck lip 11. The frame is also provided with the usual transverse braces 12 and 13, and with legs 14. At the forward end of the truck are two rollers 15 and 16, the device thus far described, and as shown in Figs. 4 and 5, being adapted for use as an ordinary truck. To provide for converting this truck to a wheelbarrow, the underside of the side bars 7 and 8 are formed with notches 17 to receive the ends of an axle 18 of a large centrally arranged wheel 19. The ends of the axle 18 may be connected with the frame in any desired manner. As herein shown, latches 20 are pivotally connected with the sides 7 and 8 and adapted to swing across the notches 17 and form a support for the underside of the ends of the axle, and these latches may be held in the closed position by providing them with slots 21 to pass over staples or eyes 22 projecting outward from the sides 7 and 8 with which eyes a pivotal hook 23 may engage. A bottom 24 will rest upon the braces 12 and 13 and side boards 25 and 26 like those of an ordinary wheelbarrow will be provided with the usual stakes 27 and 28 to engage with sockets 29 and 30 on the sides 7 and 8. The inner faces of the sides at the rear will be provided with grooves 31 to receive a backboard 32 which is passed downward between the sides so as to complete the wheelbarrow. It will be noted that the wheel 19 is much larger in diameter than the diameter of the rollers 15 and 16, so that when the wheel is in place, the rollers will be supported above the ground. When provided with a single wheel and with a bottom, sides and ends, the device forms a wheelbarrow of substantially usual construction, and the device is readily convertible from a wheelbarrow to a truck, or vice versa.

I claim:—

1. A convertible wheelbarrow and truck comprising a frame having rollers and a lifting-member at its forward end and handles at its rear end, and adapted for the removable connection with it of a barrow-wheel, and detachable barrow-pieces adapted to be connected with said frame for converting the same into a wheelbarrow.

2. A convertible wheelbarrow and truck comprising a frame having rollers and a lifting-member at its forward end and handles at its rear end, and provided on its sides with bearings for mounting a removable barrow-wheel, detachable barrow-pieces adapted to be connected with the said frame for converting the same into a wheel-barrow, and a barrow-wheel for being removably mounted in the said bearings.

3. A convertible wheelbarrow and truck comprising a frame having rollers and a lifting-member at its forward end, and handles at its rear end, and constructed to provide bearings for mounting a removable barrow-wheel, detachable barrow-pieces comprising a bottom, sides and ends and a barrow-wheel for being removably mounted in the said bearings.

4. A convertible wheelbarrow and truck comprising a frame having rollers and a lifting-member at its forward end and handles at its rear end, and provided at its sides with axle-bearings for the reception of the axle of a removable barrow-wheel, means for holding the said axle in the said bearings, detachable barrow-pieces adapted to be applied to the frame for converting the same into a wheel-barrow and a barrow-wheel having an axle for being removably mounted in the said axle-bearings.

In testimony whereof, I have signed this specification in the presence of two subscribing witnesses.

HERMAN LEMKE.

Witnesses:
HARRY V. MERRILL,
JOHN L. ELIOT.